United States Patent [19]

Buell

[11] Patent Number: 4,989,696
[45] Date of Patent: Feb. 5, 1991

[54] MOTORCYCLE FRONT AND REAR DISC BRAKE SYSTEM

[75] Inventor: Erik Buell, Mukwonago, Wis.

[73] Assignee: Buell Motor Company, Inc., Mukwonago, Wis.

[21] Appl. No.: 385,244

[22] Filed: Jul. 25, 1989

[51] Int. Cl.⁵ .................... F16D 65/10; B62D 61/02; B23P 17/00
[52] U.S. Cl. ............................. 188/218 XL; 29/412; 180/219
[58] Field of Search ............. 188/18 A, 218 XL, 344, 188/2 R, 71.1, 26, 349; 83/621; 180/219; 301/6 V; 29/412, DIG. 20

[56] References Cited

U.S. PATENT DOCUMENTS

| 141,055 | 7/1873 | Humphrey | 83/621 |
| 3,621,945 | 11/1971 | Spry | 188/218 X |
| 4,741,194 | 5/1988 | Kozyra et al. | 188/218 X |

Primary Examiner—Robert J. Oberleitner
Attorney, Agent, or Firm—Andrus, Sceales, Starke & Sawall

[57] ABSTRACT

A front and rear disc brake system for a motorcycle utilizes a first large diameter disc for the front wheel and a second disc of reduced diameter for the rear wheel. The second disc has an outer diameter less than the inner diameter of the first disc so that both discs may be stamped from the same sheet of material with a minimum amount of waste.

9 Claims, 1 Drawing Sheet

MOTORCYCLE FRONT AND REAR DISC BRAKE SYSTEM

BACKGROUND OF THE INVENTION

The present invention relates to disc brakes and more particularly to a front and rear disc brake system for a motorcycle.

Due to the short wheel bases and high centers of gravity associated with motorcycles, brake systems for motorcycles are uniquely designed to accomodate these considerations. More specifically, it is necessary to have significantly greater braking power on the front wheel than on the rear wheel. The rear brake is used more in slow speed stops and is also shielded from a cooling air flow and thus, although it does not need to have great power, it must be able to store or dissipate large amounts of heat.

High performance sport motorcycles typically utilize two front brake discs having an outside diameter between 10.50 and 12.50 inches and a thickness between 3/16 to ¼ of an inch. The rear discs utilized in such a motorcycle are typically 8.50 to 10.50 inches in diameter and also have a thickness between 3/16 and ¼ of an inch. A touring or more general use type of motorcycle will utilize a rear disc having a diameter between 10 and 12 inches and a thickness between 3/16 and ¼ of an inch.

Discs of this type are manufactured from martensitic stainless steel or the more expensive stainless clad aluminum. The discs are stamped or blanked out of sheet stock and typically a disc having an 11.50 inch outer diameter and a 6 inch inner diameter requires a 12.25 inch square of ¼ inch thick rolled material. When such a disc is stamped from the 12.25 inch square, there is approximately 75 square inches of waste material. Similarly, a disc having a 10 inch outer diameter and a 5 inch inner diameter wastes approximately 58 square inches of material when stamped from a 10.75 inch square. Therefore, the stamping of a dual front disc, single rear disc system, such as that discussed above, results in a material waste of approximately 208 square inches per brake system.

It is an object of the present invention to provide a motorcycle disc brake system that will allow for the stamping of a front and rear disc from a single sheet of material stock and thus, greatly reduce the amount of material waste typically associated with the stamping of brake discs.

SUMMARY OF THE INVENTION

A front and rear disc brake system for a motorcycle includes a first disc for use on the front wheel of the motorcycle in the form of an annulus having an outer diameter and an inner diameter defining a centrally located opening.

In accordance with one aspect of the invention, the motorcycle brake system is provided with a second disc for use on the rear wheel of the motorcycle and having an outer diameter less than the inner diameter of the first disc so that the second disc may be manufactured from the remaining material after the first disc has been stamped from a sheet of material.

In accordance with another aspect of the invention, the second disc is also in the form of an annulus having an inner diameter defining a centrally located opening.

In accordance with still another aspect of the invention, the first disc has an outer diameter of approximately 12.50 inches and an inner diameter of approximately 8.50 inches.

In accordance with still another aspect of the invention, the second disc has an outer diameter of approximately 8 inches and an inner diameter of approximately 4 inches.

BRIEF DESCRIPTION OF THE DRAWINGS

The drawings illustrate the best mode presently contemplated of carrying out the invention.

In the drawings.

DETAILED DESCRIPTION OF THE PREFERRED EMBODIMENT

Figure 1:
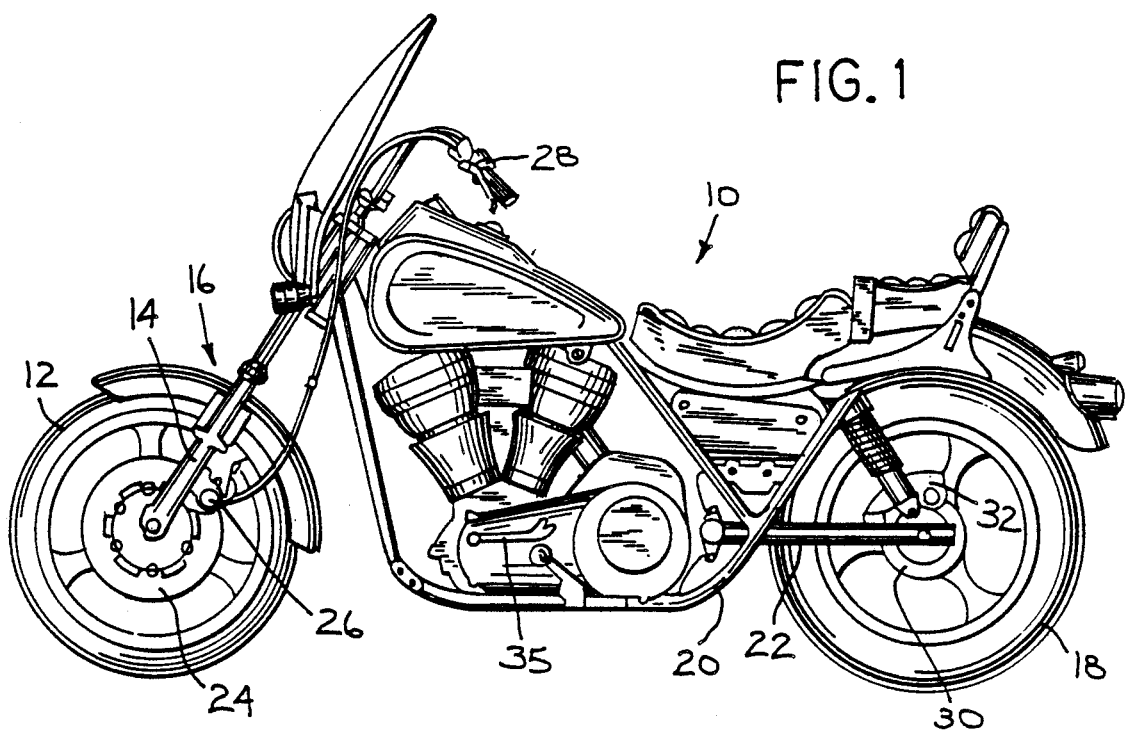
FIG. 1 is a side view of a motorcycle utilizing the brake system of the present invention.

As illustrated in FIG. 1 a motorcycle 10 includes a front wheel 12 mounted between the forks 14 of a front suspension assembly 16. A rear wheel 18 is mounted to chassis 20 by means of a swing arm 22.

The braking system for motorcycle 10 includes a pair of independently operated disc brakes. A first disc 24 having an outer diameter of approximately 12.50 inches and an inner diameter of approximately 8.50 inches is mounted on front wheel 12 and a disc gripping caliper 26 is operated by hand lever 28 in the typical manner associated with motorcycle brake systems.

The brake system further includes a second disc 30 mounted on rear wheel 18. Disc 30 has an outer diameter of approximately 8 inches and an inner diameter of approximately 4 inches. Disc 30 is gripped by caliper 32 which is operated by foot pedal 35 in a manner typical of motorcycle brake systems.

Each of discs 24 and 30 is approximately ⅜ of an inch thick and it should be noted that each is provided with a gripping surface having a width of approximately 2 inches radially on each face to ensure sufficient contact between the disc and the caliper.

Figure 2:
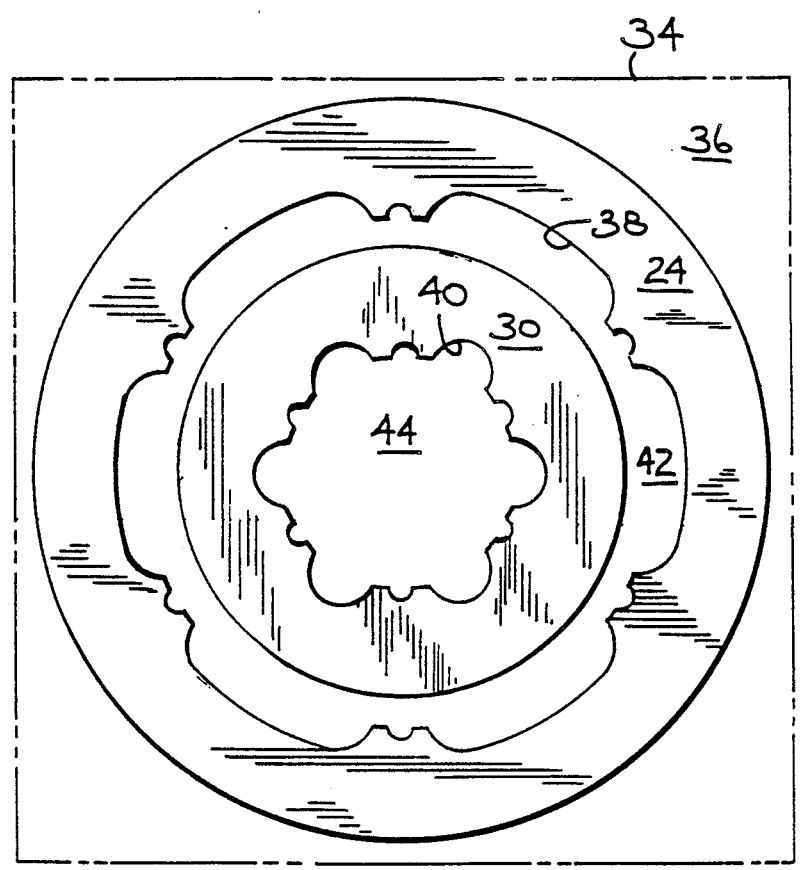
FIG. 2 is a plan view of sheet stock having discs blanked according to the present invention.

As shown in FIG. 2, the front and rear disc brake system is manufactured from a square blank 34 of suitable material such as martensitic stainless steel or stainless clad aluminum. Square blank 34 measures approximately 13.50 inches a side and when first disc 24 having an outer diameter of approximately 12.50 inches and an inner diameter of approximately 8.50 inches is stamped from blank 34 an external waste 36 of approximately 59.60 square inches results. It should be noted that inner diameter 38 of first disc 24 is scalloped so as to provide a contoured edge having various notches and slots that facilitate the fastening of first disc 24 to front wheel 12.

After first disc 24 has been stamped from square blank 34, second disc 30 is stamped from the remaining material in square blank 34. As mentioned above, second disc 30 has an outer diameter of approximately 8 inches and an inner diameter of approximately 4 inches. Once again, inner diameter 40 of second disc 30 is scalloped so as to provide the grooves and notches necessary for mounting second disc 30 on rear wheel 18. The stamping of second disc 30 results in an external waste 42 of approximately 6.47 square inches and an internal waste 44 of approximately 12.56 square inches.

Thus, the total waste from square blank 34 is approximately 78.63 square inches compared to approximately 208 square inches of waste from the prior art system of stamping disc brakes.

The present invention thus provides a front and rear disc brake system for a motorcycle having all the stopping power and cooling characteristics necessary and one which can be manufactured in a manner that results in a minimum amount of material waste.

Various modes of carrying out the invention are contemplated as being within the scope of the following claims particularly pointing out and distinctly claiming the subject matter which is regarded as the invention.

I claim:

1. A front and rear disc brake system mounted on the front and rear wheels of a motorcycle and stamped from a single sheet of brake disc material, said system comprising:
   a first disc mounted on said front wheel of said motorcycle and in the form of an annulus having an outer diameter and an inner diameter defining a centrally located opening, said first disc stamped from said sheet of brake disc material and
   a second disc mounted on said rear wheel of said motorcycle and having an outer diameter less than said first disc inner diameter, with said second disc stamped from the remaining brake disc material after said first disc has been stamped from said sheet of brake disc material.

2. The disc brake system defined in claim 1 wherein said second disc is in the form of an annulus and includes an inner diameter defining a centrally located opening.

3. The disc brake system defined in claim 2 wherein said second disc has an inner diameter of substantially 4 inches.

4. The disc brake system defined in claim 1 wherein said first disc has an outer diameter of substantially 12.5 inches and an inner diameter of substantially 8.5 inches.

5. The disc brake system defined in claim 1 wherein said second disc has an outer diameter of substantially 8 inches.

6. A method of manufacturing and assembling a front and rear disc brake system for the front and rear wheels of a motorcycle from a single sheet of brake disc material comprising:
   stamping a first disc from said sheet of brake disc material, said first disc being in the form of an annulus having an outer diameter and an inner diameter defining a centrally located opening,
   mounting said first disc on said front motorcycle wheel,
   stamping a second disc from the remaining sheet of brake disc material, said second disc being in the form of an annulus having an outer diameter less than said first disc inner diameter and an inner diameter defining a centrally located opening and
   mounting said second disc on said second motorcycle wheel.

7. The method defined in claim 6 further comprising stamping said first disc from a square sheet of material measuring substantially 13.50 inches a side.

8. The method defined in claim 6 further comprising stamping said first disc with an outer diameter of substantially 12.50 inches and an inner diameter of substantially 8.50 inches.

9. The method defined in claim 6 further comprising stamping said second disc with an outer diameter of substantially 8 inches and an inner diameter of substantially 4 inches.

* * * * *